US011368954B2

(12) United States Patent
Kim

(10) Patent No.: US 11,368,954 B2
(45) Date of Patent: Jun. 21, 2022

(54) METHOD AND APPARATUS FOR MULTI-CHANNEL ACCESS IN WIRELESS LOCAL AREA NETWORK

(71) Applicants: Hyundai Motor Company, Seoul (KR); Kia Motors Corporation, Seoul (KR); Korea National University of Transportation Industry-Academic Cooperation Foundation, Chungju-Si (KR)

(72) Inventor: Yong Ho Kim, Incheon (KR)

(73) Assignees: Hyundai Motor Company, Seoul (KR); Kia Motors Corporation, Seoul (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 113 days.

(21) Appl. No.: 16/811,218

(22) Filed: Mar. 6, 2020

(65) Prior Publication Data
US 2020/0288466 A1 Sep. 10, 2020

(30) Foreign Application Priority Data

Mar. 7, 2019 (KR) .................. 10-2019-0026339
Feb. 19, 2020 (KR) .................. 10-2020-0020675

(51) Int. Cl.
*H04W 72/04* (2009.01)
*H04W 52/02* (2009.01)

(52) U.S. Cl.
CPC ..... *H04W 72/0446* (2013.01); *H04W 52/0216* (2013.01); *H04W 72/0406* (2013.01); *H04W 72/0413* (2013.01)

(58) Field of Classification Search
CPC ......... H04W 52/0216; H04W 72/0413; H04W 84/12; H04B 7/15542; H04B 7/2687
See application file for complete search history.

(56) References Cited

U.S. PATENT DOCUMENTS

| | | | | |
|---|---|---|---|---|
| 11,039,327 | B2* | 6/2021 | John Wilson | H04W 48/12 |
| 2006/0198337 | A1* | 9/2006 | Hoang | H04W 88/02 |
| | | | | 370/329 |
| 2012/0093065 | A1* | 4/2012 | Golitschek | H04B 7/15542 |
| | | | | 370/315 |
| 2015/0098447 | A1* | 4/2015 | Kim | H04L 27/2649 |
| | | | | 370/331 |
| 2017/0086138 | A1* | 3/2017 | Choi | H04W 72/04 |
| 2017/0127419 | A1* | 5/2017 | Seok | H04W 72/0453 |
| 2018/0324669 | A1* | 11/2018 | Awad | H04L 5/0039 |
| 2020/0288466 | A1* | 9/2020 | Kim | H04W 72/0446 |

* cited by examiner

*Primary Examiner* — Raj Jain
(74) *Attorney, Agent, or Firm* — Fox Rothschild LLP

(57) ABSTRACT

An operation method performed by a first communication node for receiving a frame in a communication system is provided. A part of the frame is received from a second communication node during a first interval. A delay period is determined for delaying a switching time point from the first interval to a second interval is later than a preconfigured switching time point based on a result of receiving the part of the frame. Then a reception of the frame is completed during the delay period and the first interval is switched to the second interval.

17 Claims, 13 Drawing Sheets

METHOD AND APPARATUS FOR MULTI-CHANNEL ACCESS IN WIRELESS LOCAL AREA NETWORK

CROSS-REFERENCE TO RELATED APPLICATIONS

This application claims priority to Korean Patent Application No. 10-2019-0026339 filed on Mar. 7, 2019, and No. 10-2020-0020675 filed on Feb. 19, 2020, the entire contents of which are hereby incorporated by reference.

BACKGROUND

1. Field of the Disclosure

The present disclosure relates to channel access methods in a wireless local area network (WLAN), and more particularly to operation methods of a communication node accessing each channel and transmitting a frame in an environment where channel switching occurs between multiple channels.

2. Related Art

Recently, with the spread of mobile devices, wireless local area network (WLAN) technology, which provides fast wireless Internet service, has been developed. The WLAN technology enables mobile devices such as smart phones, smart pads, laptop computers, portable multimedia players, embedded devices, and the like to wirelessly connect to the Internet based on wireless communication technology at a short range.

Early WLAN technology used a frequency band of about 2.4 GHz in accordance with an Institute of Electrical and Electronics Engineers (IEEE) 802.11 standard to support a data transmission rate of about 1 Mbps to about 2 Mbps based on frequency hopping, spread spectrum, infrared communication, and the like. Recently, an orthogonal frequency division multiplex (OFDM) scheme was applied to support a data transmission rate of up to about 54 Mbps. In addition, the IEEE is realizing or developing standards for various technologies such as Quality of Service (QoS) enhancement, access point (AP) protocol compatibility, security enhancement, radio resource measurement, wireless access vehicular environment (WAVE), fast roaming, mesh network, interworking with external networks, and wireless network management.

Among the various IEEE 802.11 standards, IEEE 802.11b supports a data transmission rate of up to about 11 Mbps using the 2.4 GHz frequency band. IEEE 802.11a, commercialized after IEEE 802.11b, reduced impact of interferences compared to the congested 2.4 GHz frequency band using a frequency band of about 5 GHz instead of the 2.4 GHz frequency band, and improved the data transmission rate to the maximum of about 54 Mbps using the OFDM technology. However, IEEE 802.11a has a shorter communication range than IEEE 802.11b. Additionally, IEEE 802.11g, like IEEE 802.11b, uses the 2.4 GHz frequency band to realize a data transmission rate of up to about 54 Mbps. Backward compatibility of IEEE802.11g has received considerable attention, and a communication range of IEEE802.11g is superior to IEEE 802.11a.

In addition, IEEE 802.11n is a technical standard established to overcome the limitation on the data transmission rate. The limitation on the data transmission rate is considered a weak point of the WLAN. IEEE 802.11n increases speed and network reliability and extends the operating range of wireless networks. More specifically, IEEE 802.11n supports high throughput (HT) with a data throughput of up to about 540 Mbps and is based on Multiple Inputs and Multiple Outputs (MIMO) technology. MIMO uses multiple antennas at both a transmitter side and a receiver side to minimize transmission errors and optimize data rates. Additionally, IEEE 802.11n uses a coding scheme of transmitting multiple duplicate copies to increase data reliability, and may also use the OFDM to increase a transmission speed.

As the use of WLAN spreads and WLAN applications are diversified, WLAN systems have been developed to support relatively high throughput (VHT) compared to the data throughput supported by IEEE 802.11n. Among the VHT WLAN systems, IEEE 802.11ac supports a wide bandwidth (about 80 MHz to about 160 MHz) at a frequency band of about 5 GHz. IEEE 802.11ac standard is defined only in the 5 GHz frequency band, but for backward compatibility with products supporting the existing 2.4 GHz frequency band, early IEEE 802.11ac chipsets also support operations in the 2.4 GHz frequency band.

Particularly, IEEE 802.11ac supports a bandwidth of up to about 40 MHz at the 2.4 GHz frequency band. Theoretically, based on the IEEE 802.11ac standard, a WLAN speed of a multiple link terminal may be at least about 1 Gbps, and a maximum single link speed may be at least about 500 Mbps. The WLAN speed and the maximum single link speed are accomplished by extending wireless interfaces adopted by IEEE 802.11n, such as wider radio frequency bandwidth (up to about 160 MHz), more MIMO spatial streams (up to eight), multi-user MIMO, and higher density modulation (up to about 256 quadrature amplitude modulation (QAM)). In addition, IEEE 802.11ad is a scheme of transmitting data using a frequency band of about 60 GHz instead of the existing 2.5 GHz and 5 GHz bands. IEEE 802.11ad is a transmission standard that provides a data transmission rate up to about 7 Gbps using beamforming technology, and 802.11ad is suitable for large amounts of data or high bitrate video streaming such as uncompressed HD video. However, signals transmitted in the 60 GHz frequency band have difficulty passing through obstacles, and thus may be used only between devices in a short range.

The WLAN may use a wide frequency band. To use the wide frequency band, a station checks whether there is an available band for a certain period of time before transmitting data, and uses the wide frequency band by concatenating an adjacent frequency band based on whether the adjacent frequency band is available. For example, when a 20 MHz band is a primary frequency band (main channel), a 20 MHz band (i.e., first adjacent band) adjacent to the primary frequency band is available, a 20 MHz band (i.e., second adjacent band) adjacent to the first adjacent band is unavailable, and a 20 MHz band (i.e., third adjacent channel) adjacent to the second adjacent band is available, data may be transmitted using a total of 40 MHz as a transmission band since the third adjacent channel is not contiguous with the main channel).

In other words, since only the contiguous frequency bands are used as a data transmission band, an actual available frequency band is unable to be used. Additionally, the conventional radio access technology supports only one-to-one connection composed of one transmitting terminal and one receiving terminal for each transmission attempt within the same basic service set (BSS). Thus, the conventional radio access technology is inefficient since the conventional radio access technology does not operate based on differences in the connection environment or transmission data characteristics of the terminals.

IEEE 802.11p is a technical standard developed for Intelligent Transport System (ITS) communications. IEEE 802.11p uses the physical layer of IEEE 802.11a, and the Media Access Control (MAC) layer of IEEE 802.11p employs Enhanced Distributed Channel Access (EDCA) of IEEE 802.11e. The EDCA categorizes four types of packets, and has different backoff window values. The different back off window values is prioritized based on the type of the packet. A channel bandwidth of 10 MHz is used in some circumstances, and a channel bandwidth of 20 MHz may also be used in other circumstances. In addition, IEEE 802.11p supports an "outside context of BSS (OCB)" mode.

In the OCB mode, terminals may transmit and receive data without having to associate with an access point. The IEEE 1609.4 technical standard defines detailed operations based on IEEE 802.11p, and defines multi-channel operations based on multiple channels switched in time. By switching between channels in a certain time unit, each communication node communicates with another communication node using a time period allocated to the communication nodes at a given time. However, since the channel usage time is segmented into relatively small increments, there is a problem that efficiency of the channel use is decreased. Additionally, since packets generated while using other channels may attempt simultaneous channel access, there is a problem that probability of packet collision is increased.

The above-referenced technologies were described to enhance understanding of the background of the present disclosure. The above-referenced technologies may include information that does not quality as prior art with respect to the present application, and the above-referenced technologies are not necessarily known to those of ordinary skill in the art.

SUMMARY

The present disclosure provides methods, apparatuses, and systems for efficient multi-channel operations. The methods, apparatuses and systems of the present disclosure resolve the problem of inefficient packet transmission due to frequency packet collisions, backoff interruption, or the like occurring in the multi-channel operations.

According to exemplary embodiments of the present disclosure, an operation method of a first communication node for receiving a frame in a communication system may include receiving a part of a frame from a second communication node during a first interval and configuring a delay period for delaying a switching time point from the first interval to a second interval to be later than a preconfigured switching time point based on a result of receiving the part of the frame. Further, the operation method may include completing reception of the frame during the delay period and switching from the first interval to the second interval.

The second interval may be a shared channel (SCH) interval and the first interval may be a control channel (CCH) interval, or the second interval may be a CCH interval and the first interval may be an SCH interval. The first interval may be a first slot of a plurality of slots included in one of a CCH interval or an SCH interval, and the second interval may be a slot subsequent to the first interval. The part of the frame may include information regarding a time required to receive the frame. The configuring of the delay period may include calculating a reception completion time point of the frame and determining whether to delay the switching time point from the first interval to the second interval by comparing the reception completion time point of the frame with the preconfigured switching time point. The length of the delay period may be proportional to a difference between the reception completion time point and the preconfigured switching time point.

Furthermore, in accordance with exemplary embodiments of the present disclosure, an operation method of a first communication node for transmitting a frame in a communication system may include performing a random backoff operation during a first interval by starting a backoff counter based on an arbitrary backoff value and stopping the backoff counter at a preconfigured switching time point, and switching to a second interval. Further, the operation method may include switching from the second interval to a third interval and resuming the stopped backoff counter to perform the random backoff operation during the third interval.

The third interval may be a control channel (CCH) interval and the first interval may be a CCH interval, or the third interval may be a shared channel (SCH) interval and the first interval may be an SCH interval. The first interval may be a first slot of a plurality of slots included in a CCH interval or an SCH interval, and the third interval may be a second slot allocated to the first communication node after the first slot. The first interval and the third interval may be slots included in different channel intervals and allocated to the first communication node. The performing of the random backoff operation during the third interval may include determining whether the third interval is occupied during a preconfigured time after a guard interval of the third interval.

The operation method may further include, in response to determining that the third interval is occupied, performing the backoff operation based on a backoff value of the resumed backoff counter. The backoff value of the resumed backoff counter may be proportional to a difference between the arbitrary backoff value and a value of the stopped backoff counter. In response to determinating that the third interval is not occupied, a channel access may be performed at a time point after a lapse of a preconfigured inter-frame spacing (IFS) from a guard interval of the third interval.

Furthermore, in accordance with exemplary embodiments of the present disclosure, an operation method of a first communication node for transmitting a frame in a communication system may include generating a frame of a second channel to be transmitted in a second channel interval during a first channel interval and calculating a first time between a starting time point of the first channel interval and a generation time of the frame. Further, the operation method may include switching from the first channel interval to the second channel interval and configuring a channel access parameter based on the first time. Additionally, the operation method may include accessing the second channel interval based on the channel access parameter.

The second channel interval may be a shared channel (SCH) interval and the first channel interval may be a control channel (CCH) interval, or the second channel interval may be a CCH interval and the first channel interval may be an SCH interval. The channel access parameter may include at least one of a starting time of channel access and a contention window value, and the starting time of channel access may be proportional to the first time.

The accessing of the second channel may include determining whether the second channel is occupied during a preconfigured time after a guard interval of the second channel interval. In response to determining that the second channel is not occupied, the channel access may be performed at a time point after a lapse of a preconfigured inter-frame spacing (IFS) from a guard interval of the second channel interval.

During the accessing of the second channel, the second channel may be accessed after a lapse of the starting time of the channel access from a starting time point of the second channel interval. The accessing of the second channel may include configuring an arbitrary value of a contention window based on the first time as a backoff value and performing a random backoff operation based on the configured backoff value. A size of the contention window may be based on the first time, and the size of the contention window may be proportional to the first time.

According to the exemplary embodiments of the present disclosure, a communication node may be configured to operate in a multi-channel environment where an operation channel is switched between multiple channels, and the communication node may be configured to perform the back-off operation and packet transmission operation in an access target channel in conjunction with the multi-channel switching operation. Accordingly, the exemplary embodiments of the present disclosure achieve improved distribution of channel accesses of the communication nodes.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Figure 1:
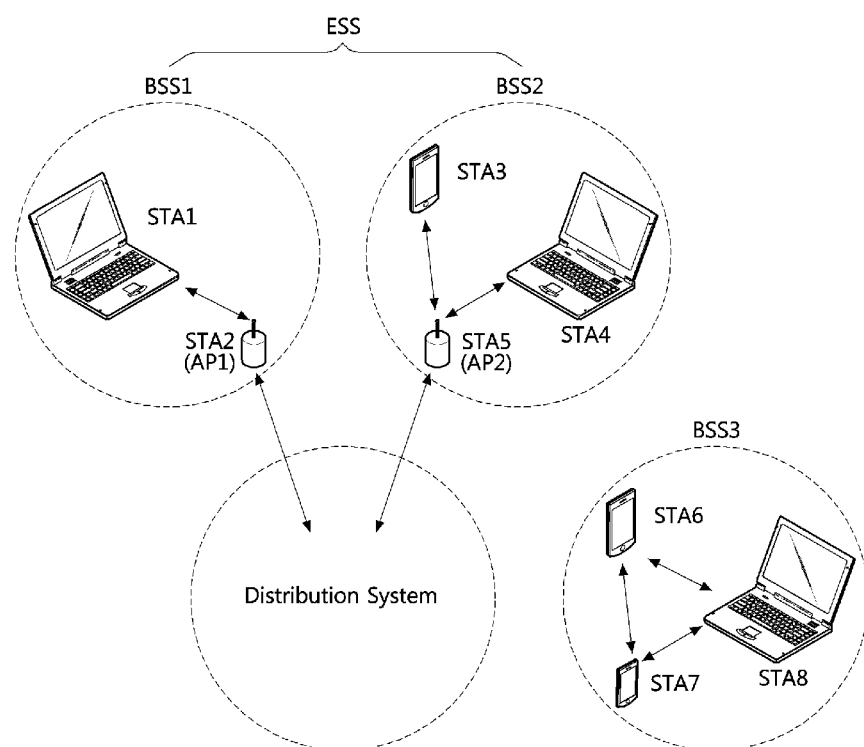
FIG. 1 is a diagram illustrating a first exemplary embodiment of a WLAN system.

Hereinafter, exemplary embodiments of the present disclosure will be described in detail with reference to the accompanying drawings. As those skilled in the art would realize, the described exemplary embodiments may be modified in various different manners, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, internal combustion powered vehicles, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit may refer to a hardware device that includes a memory and a processor. The memory may be configured to store the modules, and the processor may be specifically configured to execute said modules to perform one or more processes which are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium may also be distributed in network coupled computer systems to allow the computer readable media to be stored and executed in a distributed fashion, e.g., by a telematics server or a Controller Area Network (CAN).

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A communication system (e.g., a WLAN system) to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. The communication system may be used in the same sense as the communication network.

FIG. 1 is a diagram illustrating a first exemplary embodiment of a WLAN system. As shown in FIG. 1, a WLAN system may include at least one basic service set (BSS). The BSS denotes a set of stations (STAs) (e.g., STA1, STA2 (i.e., AP1), STA3, STA4, and STA5 (i.e., AP2), STA6, STA7, and STA8) configured to communicate with each other through successful synchronization. The BSS does not necessarily denote a specific area. In exemplary embodiments below, a station that performs a function of an access point may be referred to as an "access point (AP)", and a station that does not perform the function of an access point may be referred to as a "non-AP station" or "station".

The BSSs may be classified as infrastructure BSSs and independent BSSs (IBSSs). In particular, a BSS1 and a BSS2 may be infrastructure BSSs, and a BSS3 may be an IBSS. The BSS1 may include the station STA1, the access point STA2 (i.e., AP1) that provides a distribution service, and a distribution system (DS) that connects the plurality of access points STA2 (i.e., AP1) and STA5 (i.e., AP2). In the BSS1, the access point STA2 (i.e., AP1) may manage the STA1.

The BSS2 may include the STA3 and the STA4, the access point STA5 (i.e., AP2) that provides the distribution service, and the distribution system that connects the plurality of access points STA2 (i.e., AP1) and STA5 (i.e., AP 2). In the BSS2, the access point STA5 (i.e., AP2) may manage the STA3 and the STA4. The BSS3 may be an IBSS operating in an ad-hoc mode. In the BSS3, there is no AP that performs a management function at a center. In other words, in the BSS3, the stations STA6, STA7, and STA8 may be managed in a distributed manner. In the BSS3, all the stations STA6, STA7, and STA8 may be mobile stations and may be not permitted to connect to the DS, thus forming a self-contained network.

The access points STA2 (i.e., AP1) and STA5 (i.e., AP2) may provide access to the DS via a wireless medium for the stations STA1, STA3, and STA4 connected thereto. Communications between the stations STA1, STA3, and STA4 in the BSS 1 or the BSS2 may be generally performed via the access points STA2 (i.e., AP1) and STA5 (i.e., AP2), but when a direct link is established, direct communications between the stations STA1, STA3, and STA4 are also possible.

A plurality of infrastructure BSSs may be interconnected via a DS. A plurality of BSSs connected via a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from a first BSS to a second BSS while performing seamless communication.

The DS is a mechanism for a first AP to communicate with a second AP. The first AP may be configured to transmit a frame for stations connected to a first BSS managed by the first AP or transmit a frame for an arbitrary station having moved to a second BSS. Additionally, the AP may be configured to exchange frames with an external network, such as a wired network. The DS is not necessarily a network, and may have any form capable of providing a predetermined distribution service defined in an IEEE 802.11 standard. For example, a DS may be a wireless network, such as a mesh network, or a physical structure that connects APs with each other. Each of the communication nodes STA1, STA2 (i.e., AP1), STA3, STA4, STA5 (i.e., AP2), STA6, STAT, and STA8 included in the WLAN system may be configured as follows.

Figure 2:
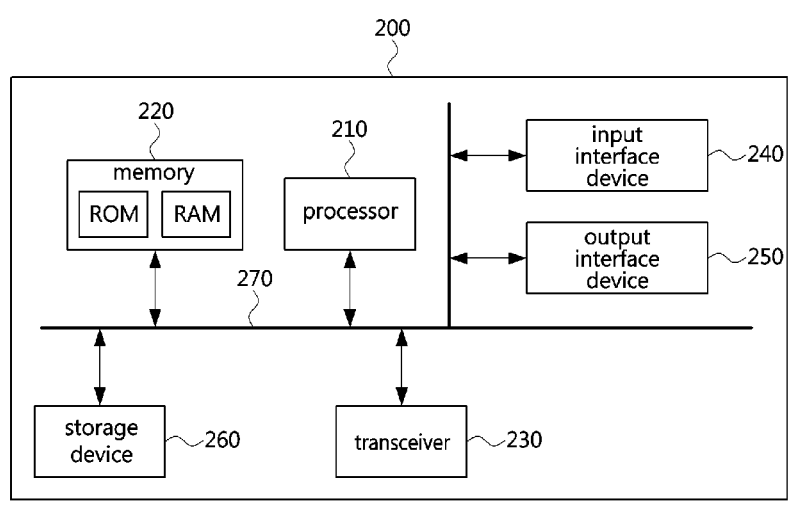
FIG. 2 is a block diagram illustrating an exemplary embodiment of a communication node configured as a WLAN system.

FIG. 2 is a block diagram illustrating an exemplary embodiment of a communication node configured as a WLAN system. As shown in FIG. 2, a communication node 200 may include at least one processor 210, a memory 220, and a transceiver 230 connected to a network for performing communications. The transceiver 230 may also be referred to as a "radio frequency (RF) unit", "RF module", or the like. Additionally, the communication node 200 may further include an input interface device 240, an output interface device 250, a storage device 260, and the like. Each component included in the communication node 200 may be configured to communicate with each other as connected via a common bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may be configured to execute at least one instruction stored in at least one of the memory 220 and the storage device 260. The processor 210 may refer to a central processing unit (CPU), a graphics processing unit (GPU), or a dedicated processor. Methods in accordance with exemplary embodiments of the present disclosure may be performed by the processor 210. Each of the memory 220 and the storage device 260 may include at least one of a volatile storage medium and a non-volatile storage medium. For example, the memory 220 may include at least one of read-only memory (ROM) and random access memory (RAM).

Figure 3:
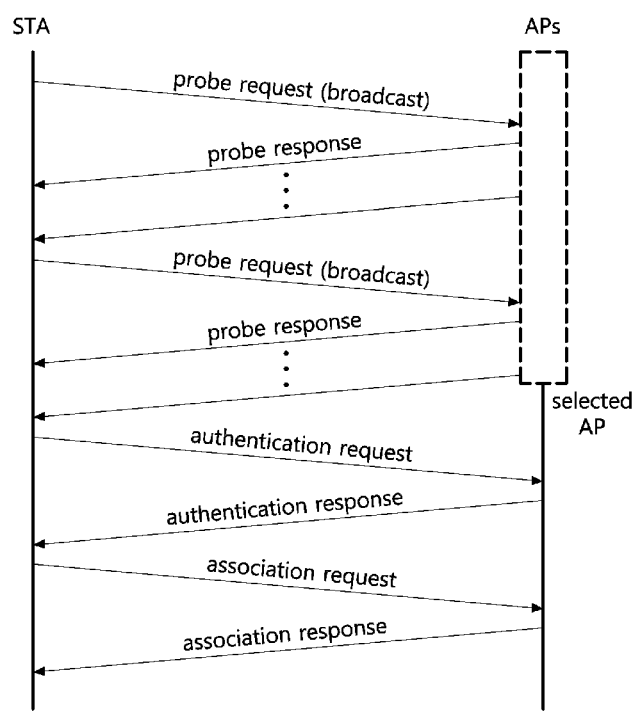
FIG. 3 is a sequence chart illustrating an association procedure of a station in a WLAN system according to an exemplary embodiment.

Meanwhile, in the WLAN system, an association procedure may be performed as follows. FIG. 3 is a sequence chart illustrating an association procedure of a station in a WLAN system. As shown in FIG. 3, an association procedure of a station STA in an infrastructure BSS may generally be divided into a probe step of probing an AP, an authentication step for authentication with the probed AP, and an association step of associating with the authenticated AP.

The station STA may be configured to first probe neighboring APs with a probe process. The probe process may be performed in a passive scanning scheme or an active scanning scheme. The passive scanning scheme may be performed by overhearing beacons transmitted by the neighboring APs. Additionally, the active scanning scheme may be performed by broadcasting a probe request frame. The APs receiving the probe request frame may be configured to transmit probe response frames that correspond to the probe request frame to the station STA. The station STA may be configured to recognize the presence of the neighboring APs by receiving the probe response frames.

Subsequently, the station STA may be configured to perform an authentication with a probed AP, and perform an authentication with the plurality of probed APs. Authentication algorithms conforming to an IEEE 802.11 standard are classified as an open system algorithm for exchanging two authentication frames and a shared key algorithm for exchanging four authentication frames. The station STA may be configured to complete an authentication with an AP by exchanging an authentication request frame and an authentication response frame based on the authentication algorithms according to an IEEE 802.1 standard.

When authentication with the access point (AP) is completed, the station STA may be configured to perform an association step with the access point (AP). In particular, the station STA may be configured to select one access point AP among authenticated access points APs, and perform the association step with the selected access point AP. In other words, the station STA may be configured to transmit an association request frame to the selected AP and receive an association response frame that is a response to the association request frame from the selected AP, and thus, the association with the selected AP may be completed.

Meanwhile, a communication node (e.g., an access point, a station, etc.) belonging to the WLAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may be classified into an association request frame, an association response frame, a reassociation request frame, a reassociation response frame, a probe request frame, a probe response frame, a beacon frame, and an association. Additionally, the management frame may include a disassociation frame, an authentication frame, a deauthentication frame, an action frame, and the like. The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frame. The QoS data frame may be configured to indicate a data frame for transmission based on the QoS, and the non-QoS data frame may be configured to indicate a data frame for transmission not based on the QoS.

Figure 4:
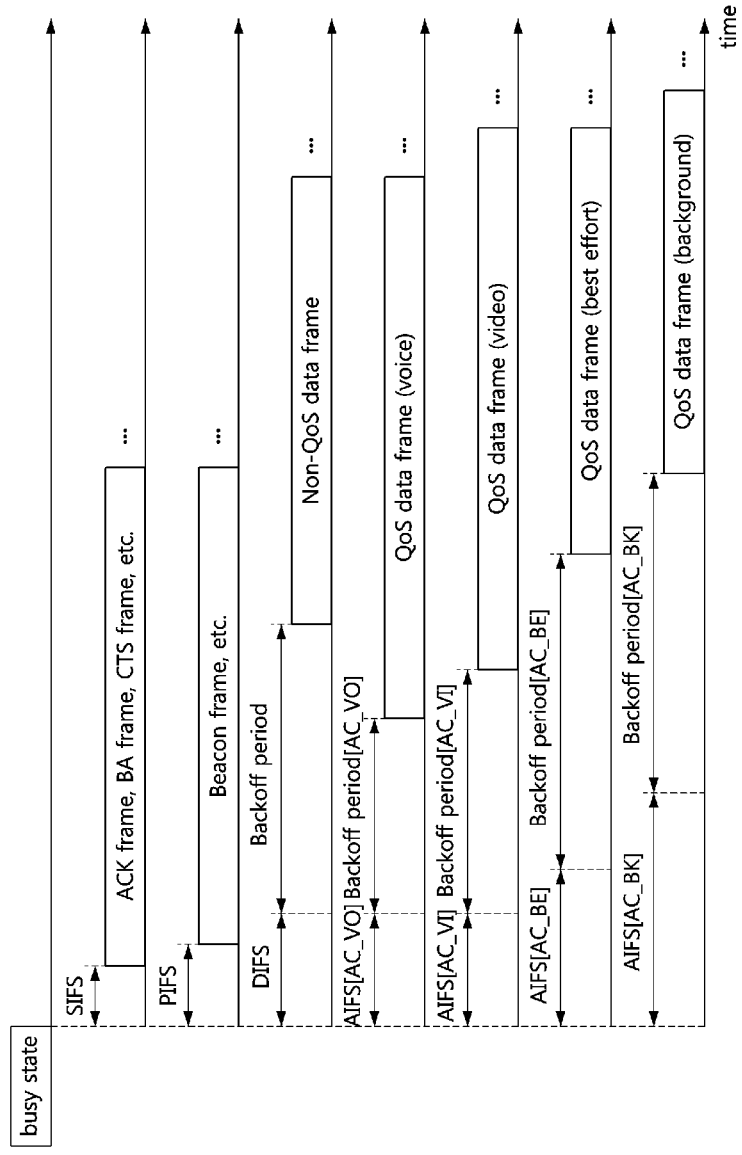
FIG. 4 is a timing diagram illustrating a first exemplary embodiment of an operation method of a communication node based on an EDCA.

Meanwhile, in the WLAN system, a communication node (e.g., an access point or a station) may be configured to operate based on the EDCA. FIG. 4 is a timing diagram illustrating a first exemplary embodiment of an operation method of a communication node based on an EDCA.

As shown in FIG. 4, a communication node that wants to transmit a control frame (or a management frame) may be configured to perform a monitoring operation (e.g., carrier sensing operation) on a channel state during a predetermined period (e.g., a short interframe space (SIFS) or a PCF IFS (PIFS)). When the channel state is determined to be an idle state during the predetermined period (e.g., SIFS or PIFS), the communication node may be configured to transmit a control frame (or a management frame). For example, the communication node may be configured to transmit an ACK frame, a BA frame, a CTS frame, or the like when the channel state is determined to be an idle state during an SIFS.

Additionally, the communication node (e.g., AP) may be configured to transmit a beacon frame or the like when the channel state is determined to be an idle state during a PIFS. When the channel state is determined to be busy during the predetermined period (e.g., SIFS or PIFS), the communication node may be configured to not transmit a control frame (or a management frame). In particular, the carrier sensing operation may be referred to as a "clear channel assessment (CCA) operation".

A communication node intending to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure, and perform the monitoring operation (e.g., carrier sensing operation) during a period that corresponds to the selected backoff value. The communication node may be configured to transmit a non-QoS data frame when the channel state is determined to be an idle state during the backoff period.

A communication node intending to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., a protocol data unit (PDU)) included in the QoS data frame. The AC of the data unit may be as shown in Table 1 below.

TABLE 1

| Priority | AC | Description |
| --- | --- | --- |
| Lowest | AC_BK | Background |
| . | AC_BE | Best effort |
| . | AC_VI | Video |
| . | AC_VO | Voice |
| Highest | | |

As shown in Table 1, AC_BK may indicate background data, AC_BE may indicate data transmitted in a best effort manner, AC_VI may indicate video data, and AC_VO may indicate voice data. For example, the length of the AIFS for the QoS data frame of each of AC_VO and AC_VI may be set equal to the length of the DIFS. The length of the AIFS for the QoS data frame of AC_BE and AC_BK may be set longer than the length of the DIFS. The length of the AIFS for the QoS data frame of AC_BK may be set longer than the length of the AIFS for the QoS data frame of AC_BE.

In the random backoff procedure, the communication node may be configured to select a backoff value (e.g., backoff counter) within a contention window based on the AC of the QoS data frame. The contention window based on the AC may be as shown in Table 2 below. As shown below, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
| --- | --- | --- |
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be in an idle state during the backoff period.

In particular, operation methods of a communication node according to exemplary embodiments of the present disclosure will be described. The methods described herein may be executed by a controller. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a non-AP station is described, the corresponding AP may be configured to perform an operation that corresponds to the operation of the non-AP station. Conversely, when an operation of the AP is described, the corresponding non-AP station may be configured to perform an operation that corresponds to the operation of the AP.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

Figure 5:
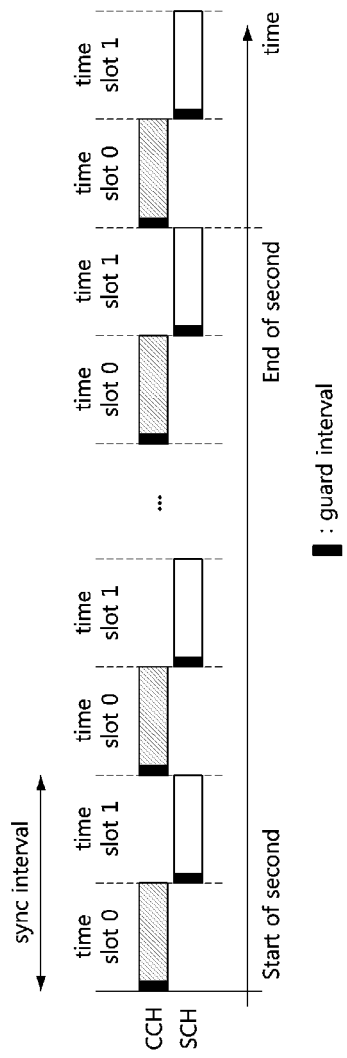
FIG. 5 is a diagram illustrating an exemplary embodiment of a synchronization interval in WAVE communication.

FIG. 5 is a diagram illustrating an exemplary embodiment of a synchronization interval in WAVE communication. As shown in FIG. 5, communication nodes using WAVE communication have a mechanism to access one or more channels in a specific time period (i.e., synchronization interval or sync interval). For example, a communication node may be configured to access one channel among a control channel (CCH) or a service channel (SCH). The communication node may be configured to access a CCH or an SCH by changing an access target channel. A method of changing a channel based on an alternating access mode (described later) may be operated based on a synchronization interval. The synchronization interval may be a time interval synchronized to a standard time used in the WAVE communication.

One synchronization interval may include a CCH interval and an SCH interval. The CCH interval may be a signal transmitted and received via a CCH, and the SCH interval may be a signal transmitted and received via an SCH. During the CCH interval, communication nodes may be configured to transmit and receive frames via the CCH. A communication node participating in an application service may be configured to switch an access target channel to the SCH during the SCH interval. During the SCH interval, the communication node may be configured to transmit and receive frames with other communication nodes belonging to a vehicle-to-everything (V2X) communication network via the SCH. Each of the CCH interval and the SCH interval may include a guard interval. Each interval may start with the guard interval. The guard interval may begin at each of the CCH interval and the SCH interval. In the guard interval, the communication node may be configured to switch the access target channel and acquire synchronization. The communication node that is switching the access target channel in the guard interval may not receive a packet.

As defined in IEEE 1609.4, the CCH interval may be about 50 ms and the SCH interval may be about 50 ms. The guard interval included in each interval (CCH interval or SCH interval) may be about 4 ms. Accordingly, in each interval (CCH interval or SCH interval), the communication node may use a channel for a time period of about 46 ms (i.e., about 50 ms to about 4 ms). The time period may exclude the guard interval. When the channel access mode is the alternating access mode, each communication node may be configured to synchronize the channel interval and the synchronization interval by a standard time such as universal time coordinated (UTC). For example, the communication node may be configured to perform synchronization of the channel interval and the synchronization interval every 1 pulse per second (PPS) interval based on the UTC.

Figure 6:
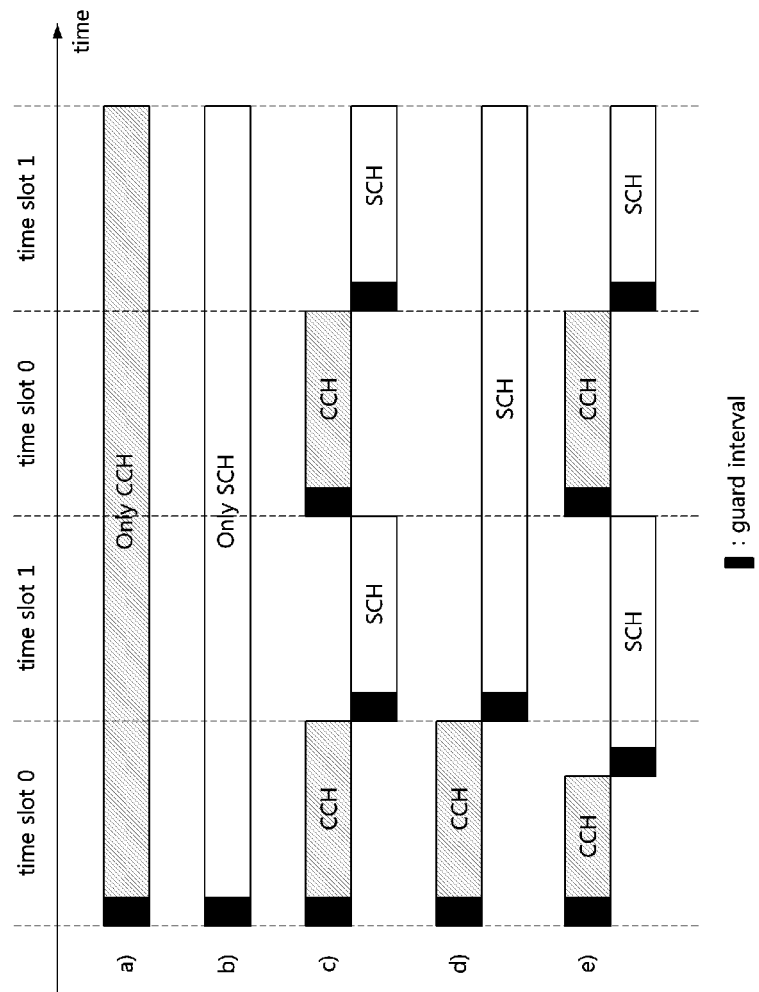
FIG. 6 is a diagram illustrating an exemplary embodiment of channel access modes of a communication node.

FIG. 6 is a diagram illustrating an exemplary embodiment of channel access modes of a communication node. As shown in FIG. 6, different MAC layers for one physical layer may divide time, and each of the MAC layers may alternately use a CCH and a different channel access mode in each allocated time slot. The channel access modes of the communication node of FIG. 6 may be classified into a continuous mode (a and b), an alternating mode (c), an extended mode (d), and immediate mode (e).

In some exemplary embodiments of the present disclosure, during the continuous mode (a and b), each communication node may be configured to operate irrespective of a time division reference such as a time slot, a CCH interval, or an SCH interval shown in FIG. 6. When the channel access mode is the continuous mode (a and b), the communication node may be configured to continuously receive operational information of the channel via a designated CCH or a designated SCH. In addition, the communication node may be configured to transmit and receive frames with other communication nodes in the V2X communication system.

When the channel access mode is the alternating mode (c), each communication node may be configured to receive operational information of the channel during the CCH interval. Additionally, when the channel access mode is the alternating mode (c), each communication node may be configured to perform a negotiation procedure for transmitting and receiving frames with other communication nodes of the V2X communication system during the CCH interval. When the channel access mode is the alternating mode (c), each communication node may be configured to transmit and receive a frame with a service provider and a user during the SCH interval. When the channel access mode is the alternating mode (c), the communication node may be configured to communicate via the CCH and SCH alternately during the configured CCH interval and SCH interval.

When the channel access mode is the extended mode (d), the communication node may be configured to alternate the CCH interval and the SCH interval as in the alternating mode (c). However, service or information exchange of the SCH interval may also be performed in the CCH interval. When the channel access mode is the extended mode (d), the communication node may be configured to transmit and receive control information during the CCH interval. When the communication node enters the SCH interval, the communication node may be configured to maintain the SCH interval until frame transmission and reception ends.

When the channel access mode is the immediate mode (e), the communication node may be configured to transmit and receive frames with other communication nodes in the V2X communication network, such as in the alternating mode (c) or the extended mode (d). However, when a negotiation for information exchange is completed during the CCH interval, the communication node may be configured to transmit and receive frames by switching a channel immediately to a designated SCH instead of waiting for termination of the CCH interval.

Figure 7A:
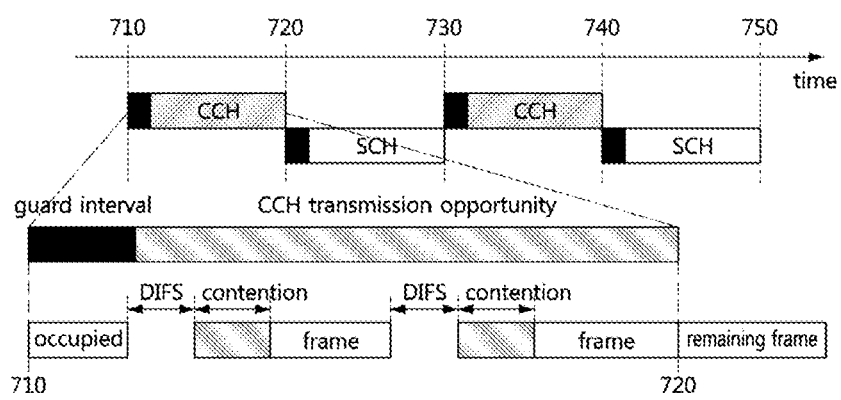
FIGS. 7A and 7B are diagrams illustrating an exemplary embodiment of a result of channel switching operation of a communication node.
Figure 7B:
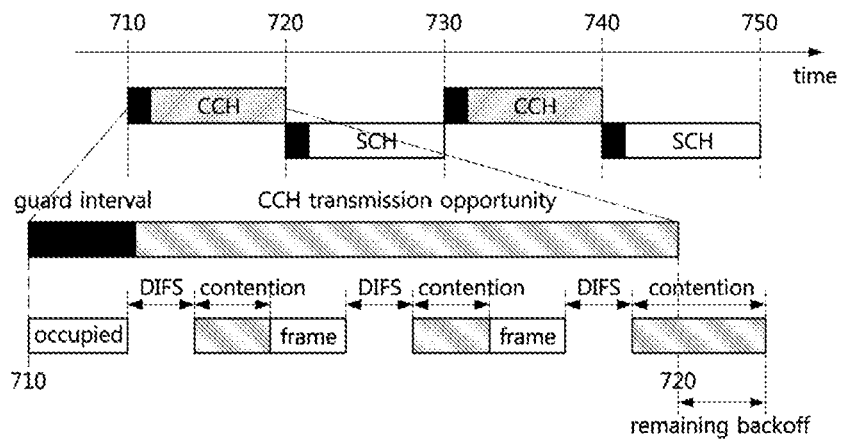

FIGS. 7A and 7B are diagrams illustrating an exemplary embodiment of a result of channel switching operation of a communication node. As shown in FIGS. 7A and 7B, communication nodes may access one channel of a CCH or an SCH during a specific time period. The communication node may alternately access the CCH and the SCH by switching between the two channels. The communication node may be configured to perform synchronization through a synchronization interval and perform channel access and switching based on the alternating access mode based on synchronized information.

One synchronization interval may include a CCH interval (e.g., interval from 710 to 720 or interval from 730 to 740) and an SCH interval (e.g., interval from 720 to 730 or interval from 740 to 750). During the CCH interval, signals may be transmitted or received via the CCH. During the SCH interval, signals may be transmitted or received via the SCH. During the CCH interval from 710 to 720, communication nodes may be configured to transmit and receive frames with other communication nodes belonging to the V2X communication network via the CCH. After a lapse of a preconfigured time interval from a starting time point of the CCH interval, a communication node participating in an application-service may be configured to switch an access target channel to the SCH, and enter to the SCH interval from 720 to 730. During the SCH interval from 720 to 730, the communication node may be configured to transmit and receive frames with other communication nodes belonging to the V2X communication network via the SCH.

The communication node may be configured to perform the channel switching operation independently on the frame transmission operation. In other words, the communication node may be configured to switch channels while performing the frame transmission operation. For example, referring to FIG. 7A, the communication node may be configured to switch an operation channel of the communication node from the CCH to the SCH at the time point 720 while performing the frame transmission operation in the CCH interval from 710 to 720. Accordingly, the communication node entering to the guard interval of the switched SCH may not be configured to transmit a part (e.g., remaining part) of the frame.

Further, the communication node may be configured to perform a backoff operation for accessing the channel independently on the frame transmission operation. In other words, the communication node may be configured to switch an operation channel of the communication node while performing the backoff operation in an access procedure for the frame transmission. For example, referring to FIG. 7B, the communication node may be configured to switch an operation channel of the communication node from the CCH to the SCH at the time point 720 while performing the backoff operation in the CCH interval from 710 to 720. Accordingly, the communication node entering to the guard interval of the switched SCH may not be configured to complete the backoff operation by the remaining backoff.

Figure 8:
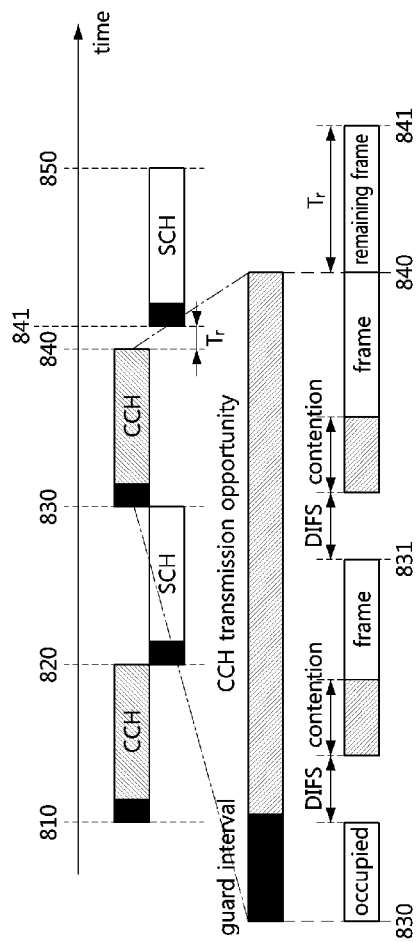
FIG. 8 is a diagram illustrating an exemplary embodiment of a frame transmission operation of a communication node according to channel switching.

FIG. 8 is a diagram illustrating an exemplary embodiment of a frame transmission operation of a communication node based on channel switching. As shown in FIG. 8, a transmitting node may be configured to transmit a frame in a CCH (or SCH) interval from 830 to 840. However, even when the transmission of the frame is not completed, a preconfigured channel switching time point 840 may arrive. The transmitting node may be configured to compare the preconfigured channel switching time point 840 with a (expected) reception completion time point 841 of the frame. The transmitting node may be configured to delay a channel switching time point, and further transmit the remaining frame via the CCH (or, SCH) during a period $T_r$ for delaying the channel switching time point.

A receiving node may be configured to receive the frame from the transmitting node in the CCH (or SCH) interval from 830 to 840. The receiving node may be configured to receive the frame via the CCH (or SCH), and specifically, to receive at least a part (e.g., part including a header) of the frame. The receiving node may be configured to determine whether reception of the frame may be completed in the CCH (or SCH) interval from 830 to 840. For example, the receiving node may be configured to calculate a (expected) reception completion time point 831 or 841 of the frame based on a reception starting time point of the frame and information regarding a time required for receiving the frame. The reception starting time point of the frame and the information on the time required for receiving the frame may be included in the header of the frame. The receiving node may be configured to compare the reception completion time point 831 or 841 of the frame with the channel switching time 840. When the reception completion time point 831 of the frame is earlier than the channel switching time 840, the receiving node may be configured to successfully receive the frame within the corresponding CCH (or SCH) interval.

Alternatively, the receiving node may be configured to receive the entire frame, and store the entire received frame in a buffer. The receiving node may be configured to perform a decoding operation on at least a part (e.g., header, etc.) of the entire frame stored in the buffer. The header of the frame may include information (i.e., time information) regarding a time required to receive the frame. The receiving node may be configured to identify the information on the time required to receive the frame based on a decoding result of the part (e.g., header) of the frame, and determine whether to decode the remaining part (e.g., payload) of the frame stored in the buffer based on the time information. In other words, the receiving node may be configured to decode the remaining part (e.g., payload) of the frame stored in the buffer or discard the frame stored in the buffer.

When the reception completion time point 841 of the frame is later than the channel switching time point 840, the receiving node may be configured to determine that the reception of the frame may not be completed within the corresponding CCH (or SCH) interval. In particular, the receiving node may be configured to delay the channel switching operation by adjusting the channel switching time point. In other words, the receiving node may be configured to delay the channel switching operation by configuring an additional delay period from 840 to 841 after completion of the CCH (or SCH) interval. The length of the delay period from 840 to 841 may be proportional to the difference between the reception completion time point of the frame and the preconfigured channel switching time point.

The receiving node that has configured the delay period from 840 to 841 may be configured to receive the frame during the delay period from 840 to 841. The receiving node that has successfully received the frame during the delay period from 840 to 841 may be configured to switch the channel after the delay period ends.

Figure 9:
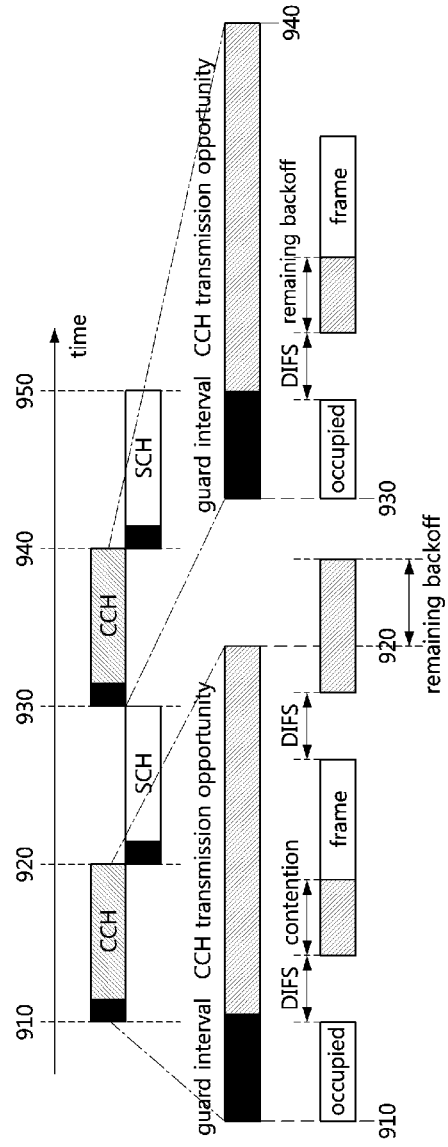
FIG. 9 is a diagram illustrating an exemplary embodiment of a backoff operation of a communication node according to channel switching.

FIG. 9 is a diagram illustrating an exemplary embodiment of a backoff operation of a communication node based on channel switching. As shown in FIG. 9, to access a CCH (or SCH), a communication node may be configured to start a backoff counter in a CCH interval from 910 to 920. The communication node may be configured to determine an arbitrary value (hereinafter, "first value") among contention window values as a backoff value, and perform a random backoff operation based on the configured backoff value. A preconfigured channel switching time point 920 may arrive while the communication node performs the random backoff operation.

When the channel switching time point 920 arrives while performing the random backoff operation, the communication node may be configured to temporarily freeze (stop) the backoff counter. The communication node may be configured to enter to an SCH interval from 920 to 930 by switching an operation channel of the communication node from the CCH to the SCH. When a channel switching time point 930 for switching from the SCH to the CCH arrives, the communication node may be configured to switch an operation channel of the communication node from the SCH to the CCH.

When the communication returns to a CCH (or SCH) interval from 930 to 940, the communication node may be configured to resume the temporarily stopped backoff counter. In addition, the communication node may be configured to determine whether the channel is occupied at a time point after a guard interval of the CCH. When the channel is not occupied by another communication node, the communication node may be configured to transmit a WAVE Service Advertisement (WSA) frame after a lapse of a preconfigured inter-frame spacing (IFS) without performing a separate backoff operation. The preconfigured IFS may be a DIFS. The communication node transmitting the frame may be configured to release the backoff counter.

When the channel is occupied by another communication node, the communication node may be configured to access the CCH by performing a backoff operation after a lapse of a preconfigured IFS. The communication node may be configured to perform the backoff operation based on a backoff value of the resumed backoff counter. The resumed backoff counter may be set to a value that is proportional to a difference between the above-described arbitrary backoff value (i.e., the first value) and the backoff value at the moment of stopping the backoff counter.

Figure 10:
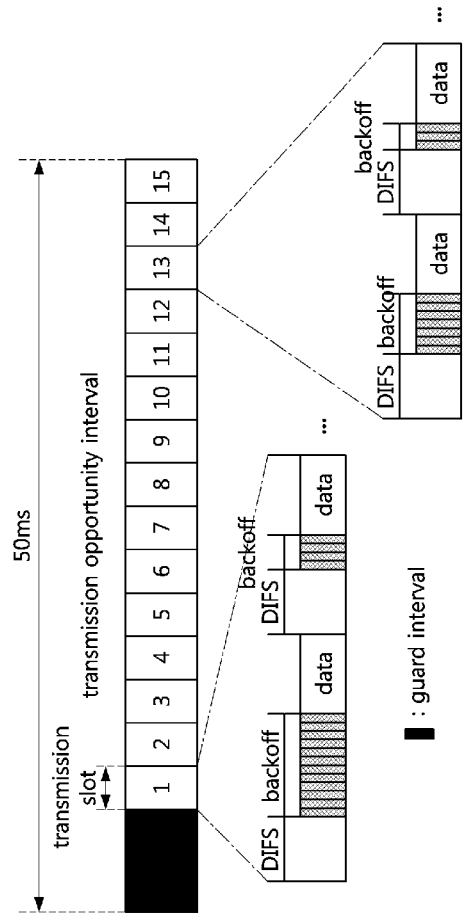
FIG. 10 is a diagram illustrating an exemplary embodiment of a channel interval including a plurality of transmission slots in a WAVE communication.

FIG. 10 is a diagram illustrating an exemplary embodiment of a channel interval including a plurality of transmission slots in a WAVE communication. As shown in FIG. 10, a channel interval (i.e., CCH interval or SCH interval) may include a transmission opportunity interval that is an interval excluding a guard interval. The transmission opportunity interval may include a plurality of transmission slots. According to the exemplary embodiment of FIG. 10, the transmission opportunity interval may include 15 transmission slots.

A communication node may be configured to attempt channel access in each transmission slot. The communication node may be configured to select one of the transmission slots included in the channel (e.g., CCH or SCH) interval. Each transmission slot may be indicated by a slot index. The communication node may be configured to select an arbitrary index among indexes of available transmission slots included in the transmission opportunity interval. For example, the communication node may be configured to select an arbitrary number among 1 to 15.

The communication node may be configured to perform channel access in a transmission slot having a slot index that corresponds to the selected number. All communication nodes in the communication network may be configured to perform synchronization at the guard interval, and simultaneously identify starting time points of the respective transmission slots. Thus, the communication nodes in the communication network may be configured to attempt channel accesses at the same time points. When the channel sensed by the communication node is idle, transmitting a signal after a lapse of a DIFS may result in a collision with a signal transmitted by another communication node. Therefore, communication nodes attempting transmission at the starting time point of the transmission slot may be configured to perform random backoff operations after a lapse of a DIFS, and then transmit a frame. The communication nodes transmitting signals after the start of the transmission slot may be configured to operate based on the state (idle or busy) of the channel, such as the general WLAN channel access.

The operation of the exemplary embodiment may be applied to transmitting a frame generated while the operation channel is switched to another channel. For example, when a frame to be transmitted via the CCH is generated while the communication node operates in the SCH interval, the communication node may be configured to transmit the frame after the channel is switched back to the CCH. In other words, the communication node generates the frame at a time point. When the time point of the frame generation is a time point that corresponds to a transmission slot 12 of the SCH interval, the communication node may be configured to perform transmission of the frame in a transmission slot 12 after switching back to the subsequent CCH interval.

Figure 11:
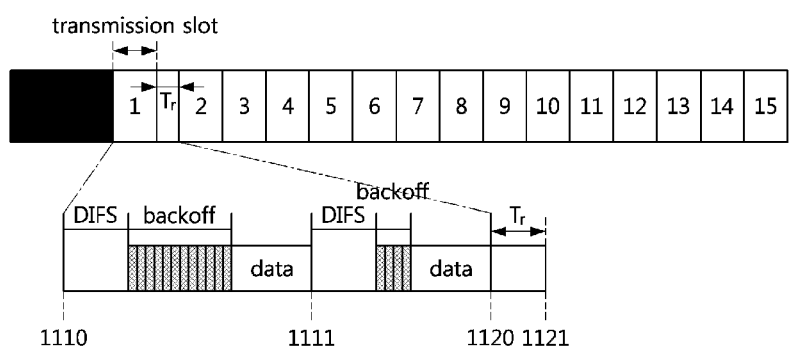
FIG. 11 is a diagram illustrating an exemplary embodiment of a frame transmission operation of a communication node according to transmission slot switching.

FIG. 11 is a diagram illustrating an exemplary embodiment of a frame transmission operation of a communication node based on transmission slot switching. As shown in FIG. 11, a transmitting node may be configured to start to transmit a frame in one transmission slot from 1110 to 1120 among transmission slots included in a CCH (or SCH) interval. However, even when the transmission of the frame is not completed, a preconfigured transmission slot switching time point 1120 may arrive.

The transmitting node may be configured to compare an ending time point 1120 of the transmission slot with a (expected) transmission completion time point 1121 of the frame. When the transmission completion time point 1121 is later than the ending time point 1120 of the transmission slot, the transmitting node may be configured to delay the transmission slot switching time point to be later than the preconfigured switching time point, and further transmit the remaining part of the frame during a period $T_r$ for delaying the transmission slot switching.

A receiving node may be configured to receive the frame from the transmitting node in one transmission slot from 1110 to 1120 among the transmission slots included in the CCH (or SCH). The receiving node may be configured to receive the frame via one transmission slot from 1110 to 1120, and specifically, receive at least a part (e.g., part including a header of the frame) of the frame. The part of the frame may include information regarding a time required to receive the frame.

The receiving node may be configured to determine whether the reception of the frame may be completed within the corresponding transmission slot from 1110 to 1120. For example, the receiving node may be configured to calculate a reception completion time point 1111 or 1121 of the frame based on a reception starting time point of the frame and the information on the time required for receiving the frame. The reception starting time point of the frame and the information on the time required for receiving the frame may be included in the part (e.g., header) of the frame. The receiving node may be configured to compare the reception completion time point of the frame with the transmission slot switching time point. When the reception completion time point of the frame is earlier than the transmission slot switching time point, the receiving node may be configured to successfully receive the frame within the corresponding transmission slot.

Additionally, when the reception completion time point of the frame is later than the transmission slot switching time point, the receiving node may be configured to determine that the reception of the frame may not be completed within the corresponding transmission slot. Therefore, the receiving node may be configured to delay the transmission slot switching operation by adjusting the transmission slot switching time point. In other words, the receiving node may be configured to delay the transmission slot switching operation by configuring an additional delay period $T_r$ from 1120 to 1121 after completion of the transmission slot from 1110 to 1120. The length of the delay period $T_r$ may be proportional to the difference between the reception completion time point of the frame and the preconfigured transmission slot switching time point.

The receiving node that has configured the delay period may be configured to complete the reception of the frame during the delay period. The receiving node that has successfully received the frame during the delay period may be configured to switch the transmission slot after the delay period ends.

Figure 12:
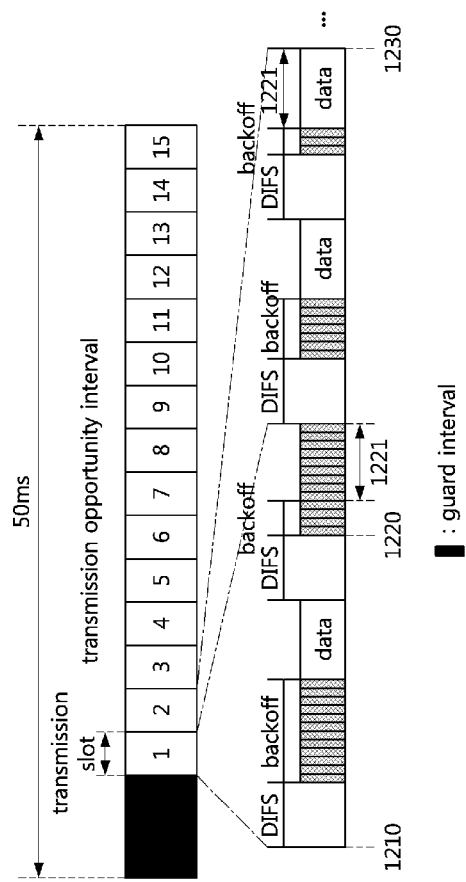
FIG. 12 is a diagram illustrating an exemplary embodiment of a backoff operation of a communication node according to transmission slot switching.

FIG. 12 is a diagram illustrating an exemplary embodiment of a backoff operation of a communication node based on transmission slot switching. As shown in FIG. 12, to access one transmission slot from 1210 to 1220 among a plurality of slots included in a CCH (or SCH) interval, the communication node may be configured to start a backoff counter. The communication node may be configured to determine an arbitrary value (hereinafter, "first value") among contention window values as a backoff value, and perform a random backoff operation based on the configured backoff value. A preconfigured transmission slot switching time point 1220 may arrive while the communication node performs the random backoff operation.

When the transmission slot switching time point 1220 arrives while performing the random backoff operation, the communication node may be configured to temporarily freeze (stop) the backoff counter. The communication node may be configured to switch the transmission slot.

When the communication node is switched back to the transmission slot from 1220 to 1230, the communication node may be configured to resume the temporarily stopped backoff counter. The communication node may be configured to determine whether the channel is occupied at the time point 1220 when the transmission slot is switched. When the transmission slot from 1220 to 1230 is not occupied, the communication node may be configured to transmit a WSA frame after a lapse of a preconfigured IFS without performing an additional backoff operation. The preconfigured IFS may be a DIFS. The communication node transmitting the WSA frame may be configured to release the backoff counter.

Additionally, when the transmission slot from 1220 to 1230 is occupied, the communication node may be configured to access the transmission slot from 1220 to 1230 by performing a backoff operation after a lapse of a preconfigured IFS. The communication node may be configured to perform the backoff operation based on the backoff value 1221 of the resumed backoff counter. The resumed backoff counter may be configured with a value that is proportional to the difference between the arbitrary backoff value (i.e., the first value) and the backoff value 1221 at the moment of stopping the backoff counter.

Figure 13:
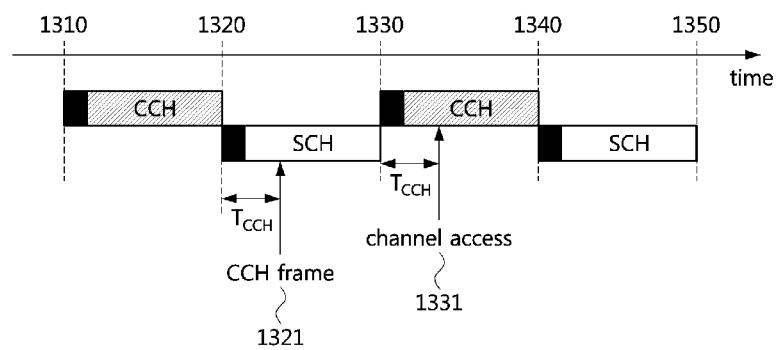
FIG. 13 is a diagram illustrating a first exemplary embodiment of a frame reception operation of a communication node that receives a frame via another channel.

FIG. 13 is a diagram illustrating a first exemplary embodiment of a frame reception operation of a communication node that receives a frame via another channel. As shown in FIG. 13, a communication node may be configured to transmit and receive a WSM frame with other communication nodes in an SCH interval from 1320 to 1330. The communication node may be configured to generate the WSA frame at a time point 1321 after a time duration $T_{CCH}$ from a starting time point 1320 of the SCH interval. The WSA frame may be a frame that is transmitted and received during the CCH interval. Therefore, the communication node may not be configured to transmit the generated WSA frame in the SCH interval.

The communication node may be configured to calculate the time duration $T_{CCH}$. The time duration $T_{CCH}$ may be a value for configuring a parameter used to perform channel access. The communication node may be configured to then switch an operation channel of the communication node from the SCH to the CCH at the time point 1330. After switching to the CCH, the communication node may be configured to perform an access operation at a time point 1331 on the CCH to transmit the WSA frame.

The communication node may be configured to perform the channel access operation after a lapse of a time that corresponds to the time duration $T_{CCH}$ from the time point 1330 of channel switching to the CCH. The communication node may be configured to determine whether the channel is occupied at a time point after a lapse of the time duration $T_{CCH}$ from the time point of channel switching to the CCH. When the channel is not occupied by another communication node, the communication node may be configured to transmit the WSA frame after a lapse of a preconfigured IFS. The preconfigured IFS may be a DIFS. Additionally, when the channel is occupied by another communication node, the communication node may be configured to access the CCH by performing a random backoff operation after a lapse of the preconfigured IFS.

Figure 14:
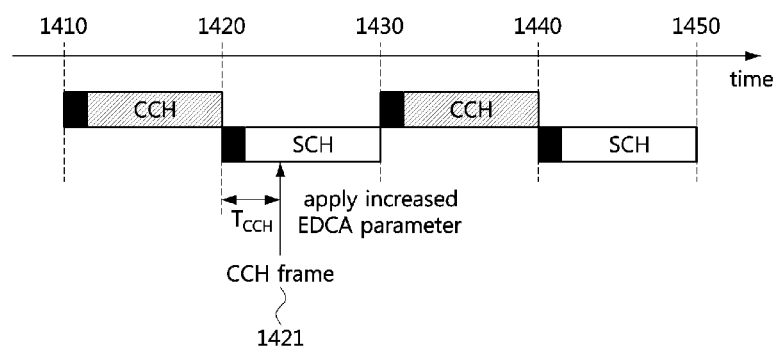
FIG. 14 is a diagram illustrating a second exemplary embodiment of a frame reception operation of a communication node that receives a frame via another channel.

FIG. 14 is a diagram illustrating a second exemplary embodiment of a frame reception operation of a communication node that receives a frame via another channel. As shown in FIG. 14, a communication node may be configured to transmit and receive a WSM frame with other communication nodes in an SCH interval from 1420 to 1430. The communication node may be configured to generate the WSA frame at a time point 1421 after a lapse of the time duration $T_{CCH}$ from a starting time point 1420 of the SCH interval. The WSA frame may be a frame that is transmitted and received during the CCH interval. Therefore, the communication node may not be configured to transmit the generated WSA frame in the SCH interval.

The communication node may be configured to calculate the time duration $T_{CCH}$. The time duration $T_{CCH}$ may be a value for configuring a parameter used to perform channel access. The communication node may be configured to then switch an operation channel of the communication mode from the SCH to the CCH. After switching to the CCH, the communication node may be configured to perform an access operation on the CCH to transmit the WSA frame.

The communication node may be configured to determine whether the channel is occupied at a time point after the guard interval of the CCH ends. When the channel is not occupied by another communication node, the communication node may be configured to transmit the WSA frame after a lapse of a preconfigured IFS. The preconfigured IFS may be a DIFS.

When the channel is occupied by another communication node, the communication node may be configured to access the CCH by performing a random backoff operation after a lapse of a preconfigured IFS. The communication node may be configured to configure a parameter for the random backoff operation based on the time duration $T_{CCH}$. The communication node may be configured to perform channel access based on the configured parameter.

According to an exemplary embodiment of the present disclosure, the communication node may be configured to determine a proportional factor based on the size of the time duration $T_{CCH}$. The communication node may be configured to increase the size of the contention window by multiplying the maximum value of the contention window by the proportional factor (e.g., a value greater than 1). Accordingly, the communication node may be configured to determine one of a plurality of values within a range of the contention window having the increased size as a backoff value, and perform the random backoff operation based on the configured backoff value.

Alternatively, the communication node may be configured to maintain the maximum value of the contention window, and configure the proportional factor as (the time duration $T_{CCH}$/channel interval time). The communication node may be configured to determine one of a plurality of values within a range of the contention window as a backoff value, and multiply the configured backoff value by the proportional factor. Accordingly, to transmit a frame generated at the ending part of the channel, the communication node may be configured to determine a value approaching the maximum value of the contention window as the backoff value. Additionally, to transmit a frame generated at the beginning part of the channel, the communication node may be configured to determine a smaller value due to the proportional factor as the backoff value. The communication node may be configured to access the CCH by performing the random backoff procedure based on the backoff value.

According to another exemplary embodiment of the present disclosure, the communication node may be configured to determine the parameter for the random backoff operation without considering the time duration $T_{CCH}$. The communication node may be configured to perform channel access based on the configured parameter. For example, to transmit a frame generated within the SCH interval, the terminal may be configured to use a parameter having a value larger than the general backoff parameter. The communication node may be configured to access the CCH by performing the random backoff procedure based on the newly configured backoff parameter. Therefore, channel accesses of terminals may be distributed over the entire channel interval. The same scheme may be applied to data to be transmitted via the SCH. The SCH may be generated within the CCH channel interval.

The same scheme may be applied to other parameters (e.g., EDCA parameters, arbitration inter-frame spacing (AIFS), etc.) for channel access as well as the backoff parameter. Therefore, by configuring the parameters for channel access in the above-described scheme, channel accesses of communication nodes may be distributed over the entire channel interval.

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory. The non-transitory computer readable medium may be specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all the variations and modifications as come within the true spirit and scope of the exemplary embodiments herein.

What is claimed is:

1. An operation method of a first communication node for receiving a frame in a communication system, comprising:
   receiving, by a controller, a part of a frame from a second communication node during a first interval;
   determining, by the controller, a delay period for delaying a switching time point from the first interval to a second interval to be later than a preconfigured switching time point based on a result of receiving the part of the frame;
   completing, by the controller, reception of the frame during the delay period; and
   switching, by the controller, from the first interval to the second interval,
   wherein the part of the frame includes information regarding a time required to receive the frame, and the determining of the delay period comprises:
   calculating, by the controller, a reception completion time point of the frame; and
   determining, by the controller, whether to delay the switching time point from the first interval to the second interval by comparing the reception completion time point of the frame with the preconfigured switching time point.

2. The operation method according to claim 1, wherein the second interval is a shared channel (SCH) interval and the first interval is a control channel (CCH) interval, or the second interval is a CCH interval and the first interval is an SCH interval.

3. The operation method according to claim 1, wherein the first interval is a first slot of a plurality of slots included in one of a CCH interval or an SCH interval, and the second interval is a slot subsequent to the first interval.

4. The operation method according to claim 1, wherein a length of the delay period is proportional to a difference between the reception completion time point and the preconfigured switching time point.

5. An operation method of a first communication node for transmitting a frame in a communication system, comprising:
   performing, by a controller, a random backoff operation during a first interval by starting a backoff counter based on an arbitrary backoff value;
   stopping, by the controller, the backoff counter at a preconfigured switching time point, and switching to a second interval;
   switching, by the controller, from the second interval to a third interval; and
   resuming, by the controller, the stopped backoff counter to perform the random backoff operation during the third interval.

6. The operation method according to claim 5, wherein the third interval is a control channel (CCH) interval and the first interval is a CCH interval, or the third interval is a shared channel (SCH) interval and the first interval is an SCH interval.

7. The operation method according to claim 5, wherein the first interval is a first slot of a plurality of slots included in a CCH interval or an SCH interval, and the third interval is a second slot allocated to the first communication node after the first slot.

8. The operation method according to claim 7, wherein the first interval and the third interval are slots included in different channel intervals and allocated to the first communication node.

9. The operation method according to claim 5, wherein the performing of the random backoff operation during the third interval includes:
   determining, by the controller, whether the third interval is occupied during a preconfigured time after a guard interval of the third interval.

10. The operation method according to claim 9, further comprising:
    in response to determining that the third interval is occupied, performing, by the controller, the backoff operation based on a backoff value of the resumed backoff counter, wherein the backoff value of the resumed backoff counter is proportional to a difference between the arbitrary backoff value and a value of the stopped backoff counter.

11. The operation method according to claim 9, wherein in response to determining that the third interval is not occupied, a channel access is performed at a time point after a lapse of a preconfigured inter-frame spacing (IFS) from a guard interval of the third interval.

12. An operation method of a first communication node for transmitting a frame in a communication system, comprising:
    generating, by a controller, a frame of a second channel to be transmitted in a second channel interval during a first channel interval;
    calculating, by the controller, a first time between a starting time point of the first channel interval and a generation time of the frame;
    switching, by the controller, from the first channel interval to the second channel interval;
    determining, by the controller, a channel access parameter based on the first time; and
    accessing, by the controller, the second channel interval based on the channel access parameter,
    wherein the channel access parameter includes a starting time of channel access and/or a contention window value, and the starting time of channel access is proportional to the first time.

13. The operation method according to claim 12, wherein the second channel interval is a shared channel (SCH) interval and the first channel interval is a control channel (CCH) interval, or the second channel interval is a CCH interval and the first channel interval is an SCH interval.

14. The operation method according to claim 12, wherein the accessing of the second channel includes:
    determining, by the controller, whether the second channel is occupied during a preconfigured time after a guard interval of the second channel interval.

15. The operation method according to claim 12, wherein in response to determining that the second channel is not occupied, the channel access is performed at a time point after a lapse of a preconfigured inter-frame spacing (IFS) from a guard interval of the second channel interval.

16. The operation method according to claim 12, wherein, during the accessing of the second channel, the second channel is accessed after a lapse of the starting time of the channel access from a starting time point of the second channel interval.

17. The operation method according to claim 12, wherein the accessing of the second channel includes:
- determining, by the controller, an arbitrary value of a contention window based on the first time as a backoff value; and
- performing, by the controller, a random backoff operation based on the configured backoff value,
- wherein a size of the contention window based on the first time is proportional to the first time.

* * * * *